United States Patent
Kato et al.

(10) Patent No.: US 9,183,178 B2
(45) Date of Patent: Nov. 10, 2015

(54) ONBOARD DEVICE AND CONTROL METHOD

(75) Inventors: Seiya Kato, Fujisawa (JP); Hiroto Mitoma, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/882,385

(22) PCT Filed: Nov. 1, 2010

(86) PCT No.: PCT/JP2010/069442
§ 371 (c)(1),
(2), (4) Date: Jul. 10, 2013

(87) PCT Pub. No.: WO2012/059973
PCT Pub. Date: May 10, 2012

(65) Prior Publication Data
US 2013/0282236 A1  Oct. 24, 2013

(51) Int. Cl.
| | |
|---|---|
| *G08G 1/16* | (2006.01) |
| *G08G 1/09* | (2006.01) |
| *B60R 21/00* | (2006.01) |
| *H04W 4/04* | (2009.01) |
| *G06F 17/00* | (2006.01) |
| *G01S 5/00* | (2006.01) |
| *B60W 30/14* | (2006.01) |

(Continued)

(52) U.S. Cl.
CPC .............. *G06F 17/00* (2013.01); *G01S 5/0072* (2013.01); *G08G 1/163* (2013.01); *G08G 1/166* (2013.01); *B60W 30/143* (2013.01); *B60W 30/16* (2013.01); *B60W 2050/008* (2013.01); *B60W 2550/408* (2013.01)

(58) Field of Classification Search
CPC ......... G08G 1/163; G08G 1/166; G08G 1/22; G06F 17/00; G01S 5/0072; B60W 2050/0078; B60W 2050/008; B60W 2550/408; B60W 30/143; B60W 30/16
See application file for complete search history.

(56) References Cited

U.S. PATENT DOCUMENTS 4,757,450 A * 7/1988 Etoh ............................... 701/96
5,572,449 A * 11/1996 Tang et al. .................... 700/304
6,275,773 B1 * 8/2001 Lemelson et al. ............ 701/301

(Continued)

FOREIGN PATENT DOCUMENTS

| JP | 2006-195641 A | 7/2006 |
|---|---|---|
| JP | 2008-046873 A | 2/2008 |

(Continued)

*Primary Examiner* — Michael J Zanelli
(74) *Attorney, Agent, or Firm* — Volpe and Koenig, P.C.

(57) ABSTRACT

Another detection device reduces the time needed for travel motion information about another vehicle obtained by an accurate detector device, and to continues supplement for the other vehicle in the event that detection is lost. All onboard controller is connected to a communication device as a first detector device for outputting the travel motion information about another vehicle, and a sensor as a second detector device. When the difference between first travel motion information from the first detection device and second travel motion information from the second detection device is equal to or less than a predetermined threshold value, and the period of continuous detection of the second travel motion information from the second detection device is equal to or greater than a predetermined threshold value, the controller determines the first travel motion information and the second travel motion information to be travel motion information for the same vehicle.

13 Claims, 9 Drawing Sheets

(51) Int. Cl.
*B60W 50/00* (2006.01)
*B60W 30/16* (2012.01)

(56) References Cited

U.S. PATENT DOCUMENTS

2009/0237293 A1* 9/2009 Sakuma ................ 342/146
2010/0052945 A1* 3/2010 Breed ..................... 340/903
2011/0166746 A1* 7/2011 Breuer et al. ............ 701/34
2013/0231829 A1* 9/2013 Gerdt ...................... 701/41

FOREIGN PATENT DOCUMENTS

JP 2010-086269 A 4/2010
WO WO2009/141025 A1 * 11/2009

* cited by examiner

| VEHICLE IDENTIFIER | LATITUDE | LONGITUDE | SPEED [m/s] | DIRECTION | TIME STAMP | DETECTION DURATION |
|---|---|---|---|---|---|---|
| #0000 | 35.00000 | 140.00000 | 16.7 | 0.0 | 0003200 | 3000 |
| #0010 | 35.00020 | 139.99998 | 16.7 | 170.0 | 0003120 | 2000 |
| #0020 | 35.00050 | 139.99992 | 16.7 | 340.0 | 0003250 | 2000 |
| #0030 | 35.00121 | 139.99940 | 8.5 | 300.0 | 0003200 | 0000 |

| DETECTION NO. | RELATIVE DISTANCE [m] | RELATIVE POSITION ANGLE | RELATIVE SPEED [m/s] | DIRECTION | DETECTION DURATION [ms] |
|---|---|---|---|---|---|
| #S01 | 20.0 | 354.3 | 32.0 | 175.0 | 1000 |

| VEHICLE IDENTIFIER/ SENSOR DETECTION NO. | RELATIVE DISTANCE [m] | RELATIVE POSITION ANGLE | RELATIVE SPEED [m/s] | DIRECTION | TIME STAMP | DETECTION DURATION | SOURCE | DETECTION STATUS |
|---|---|---|---|---|---|---|---|---|
| #000010 | 25.0 | 354.3 | 32.0 | 175.0 | 0003120 | 2000 | 2 (COMMUNICATION) | 0 (UNDETECTED) |
| #000020 | 50.6 | 351.0 | 32.9 | 350.0 | 0003200 | 2000 | 2 (COMMUNICATION) | 0 (UNDETECTED) |
| #000030 | 135.1 | 333.6 | 22.5 | 340.9 | 0003200 | 0000 | 2 (COMMUNICATION) | 0 (UNDETECTED) |
| #S01 | 20.0 | 350.0 | 32.0 | 175.0 | 0003300 | 1000 | 1 (SENSOR) | 0 (UNDETECTED) |

| VEHICLE IDENTIFIER | SENSOR DETECTION NO. | RELATIVE DISTANCE [m] | RELATIVE POSITION ANGLE | RELATIVE SPEED [m/s] | DIRECTION | STATUS |
|---|---|---|---|---|---|---|
| #000010 | #S01 | 20.0 | 350.0 | 32.0 | 175.0 | #03(BEING IDENTIFIED) |
| #000020 | - | 50.6 | 351.0 | 32.9 | 350.0 | #04(LOST AFTER IDENTIFIED) |
| #000030 | - | 135.1 | 333.6 | 22.5 | 340.9 | #01(COMMUNICATION ONLY) |

ONBOARD DEVICE AND CONTROL METHOD

TECHNICAL FIELD

The present invention relates to an onboard device for vehicle use and a control method therefore.

BACKGROUND ART

Motor vehicles are increasingly equipped with various safety devices to meet the rising demand for greater safety. In recent years, mounting of external recognition sensors for detecting objects around as safety devices is making progress. Such external recognition sensors include laser radars and millimeter wave radars. By using these devices, it is made possible to detect objects around, alert the driver and/or execute running control processing according to the situation around, and avoid danger. An exemplary way is to detect a vehicle ahead with a laser radar, alert the driver if a risk of collision is recognized and, if the risk of collision is still impossible to avoid, apply an automatic brake thereby to reduce the damage of possible collision. However, an automobile or the like suddenly emerging from sideways cannot be detected by a sensor alone, and the consequent collision cannot be avoided. In this connection, there is an application that detects, by the use of communication independent of a sensor, a situation that cannot be detected by the sensor, and thereby avoids the possible collision.

Also, Patent Literature 1 describes a method by which the level of reliability regarding whether a given vehicle really exists is set by using a degree of multiplicity of detection of the same object by a sensor and communication, and the available application according to that level of reliability.

Further, Patent Literature 2 describes a method by which threshold values are provided regarding errors in the vehicle's speed and position, a vehicle detected by a sensor and communication is identified, and steering information and the like are added by the use of communication to sensor information and utilized as added.

CITATION LIST

Patent Literature

Patent Literature 1: JP-A No. 2006-195641
Patent Literature 2: JP-A No. 2010-086269

SUMMARY OF INVENTION

Technical Problem

The technique described in Patent Literature 1, as it takes no account of any error in positional information obtained by communication, may handle the vehicle detected by communication and the vehicle detected by the sensor as different vehicles in actual use.

The technique described in Patent Literature 2, as it does take account of any error in positional information obtained by communication, can determine whether the vehicle detected by communication and the vehicle detected by the sensor are the same or different, and makes possible more sophisticated control and alarming that utilize additional vehicle information obtained by communication. However, the processing of these control and alarming presupposes that the vehicle is detected by the sensor, and cannot be utilized if the sensor is unable to detect the vehicle. Especially, as sensors are narrow in detectable range, the detectable range of a sensor greatly moves up and down or left and right, a vehicle ahead may fail to be detected (hereinafter, this phenomenon that an object once detected by a sensor later goes out of the detectable range and becomes undetectable will be referred as being "lost"). On the other hand, in order to avoid erroneous detection by a sensor, only continuous detection of the same object for a prescribed duration is used for control and alarming. For this reason, once the object is made undetectable by a curve or the like, even if the vehicle ahead appears again within the detectable range, it takes time to enter into a state of being usable for control and alarming, and control and alarming for avoidance of collision may become impossible.

Such a problem arises when a plurality of detection devices (devices for detecting other vehicles) differing in characteristics are used, even if the two sets of detection data can be identified as representing driving status information of the same vehicle, the differences in characteristics between the detection devices may later invite a situation where no detection data can be acquired from one detection device. The differences in characteristics refer to, as stated above, the detectable range and errors in or accuracy of detected data (driving status information). Driving status information derived from a sensor output excels in the accuracy of detection data relative to the host vehicle, but is limited in detectable range. For this reason, the vehicle ahead goes out of the detectable range, resulting in a situation where detection is interrupted. On the other hand, driving status information obtained by wireless communication with other vehicles has a broader range of radio wave reach than the sensor's detectable range, driving status information of other vehicles can continue to be received even when detection by a sensor is interrupted or when detection by a sensor is impossible as yet. However, as both host and other vehicles acquire their respective positions by GPS receivers, the positional accuracy is inferior to sensors. A situation where no detection data can be acquired is not limited to sensor-based cases as described above. In a case where a plurality of communication apparatuses using wireless communication are used as detection devices, use of different radio frequencies may suffer, even if one device can communicate (acquire driving status information), interruption of communication by the other by a building or the like.

Means for Solving Problem

An onboard device to be disclosed is configured as stated below, and a control method therefore uses a controller. It has first and second devices that output driving status information of another vehicle, and a controller that determines, when the difference between first driving status information from the first detector device and second driving status information from the second detector device is equal to or less than a predetermined threshold value and the detection duration of the second driving status information from the second detector device is equal to or longer than a threshold value, which is prescribed as the period of time taken for identification and shorter than the detection duration prescribed for detection of another vehicle by the second detector device alone, determines that both the first driving status information and the second driving status information are driving status information of the same other vehicle.

In an onboard device in another desirable mode, the controller assigns the first driving status information as the driving status information of the other vehicle when, after both the first driving status information and the second driving status information are determined to be the driving status information of the other vehicle, the second driving status information of the other vehicle is not outputted from the second detector device.

An onboard device in still another desirable mode, the controller, after assigning the first driving status information as the driving status information of the other vehicle with the second driving status information of the other vehicle failing to be outputted from the second detector device, determines that both the first driving status information and the second driving status information are driving status information of the other vehicle when the difference between the first driving status information from the first detector device and the second driving status information from the second detector device is equal to or smaller than a predetermined threshold value.

An onboard device in yet another desirable mode further having a third detector device that outputs driving status information of the host vehicle.

In an onboard device in yet another desirable mode, the first detector device is a communication device that receives the first driving status information, which is first absolute driving status information of the other vehicle transmitted from the other vehicle; the second detector device is a sensor that detects the other vehicle and outputs the second driving status information, which is second relative driving status information of the other vehicle with respect to the host vehicle; the third detector device is a GPS receiver that outputs third absolute driving status information of the host vehicle; and the controller acquires first relative driving status information of the other vehicle from the third absolute driving status information and the first driving status information of the host vehicle, and figures out the difference between the first driving status information and the second driving status information as the difference between the first relative driving status information and the second relative driving status information.

Advantageous Effects of the Invention

Even on a curve, bridge or the like, if there is driving status information of another vehicle from another detector device, tracking of that other vehicle can be continued by that other detector device, and the time taken from the detection of that other vehicle by a sensor until control and alarming can be reduced.

BRIEF DESCRIPTION OF DRAWINGS

FIG. 6 shows the configuration of a pre-integration processing data buffer.

FIG. 7 shows the configuration of integrated data.

DESCRIPTION OF EMBODIMENT

An onboard device, which is an embodiment of the present invention, is configured as described below, and its control method uses a controller. The controller is connected to a communication device as a first detector device that outputs driving status information of other vehicles and to a sensor as a second detector device. The controller determines, when the difference between the first driving status information from the first detector device and the second driving status information from the second detector device is equal to or less than a predetermined threshold value and the detection duration of the second driving status information from the second detector device is equal to or longer than a threshold value, which is prescribed as the period of time taken for identification and shorter than the detection duration prescribed for detection of another vehicle by the second detector device alone, that both the first driving status information and the second driving status information are driving status information of the same other vehicle. Thus, when the first driving status information from a communication apparatus less accurate than the second driving status information can be acquired, the controller identifies both the first driving status information and the second driving status information as driving status information of the same other vehicle by using the period of time taken for identification, which is shorter than the detection duration set for detection of the other vehicle by the sensor alone. In this way, the time taken to make the driving status information of that other vehicle from a sensor, which is a more accurate detector device, available for use in alarming and control, is shortened.

A more detailed description will be made below with reference to drawings.

Figure 1:
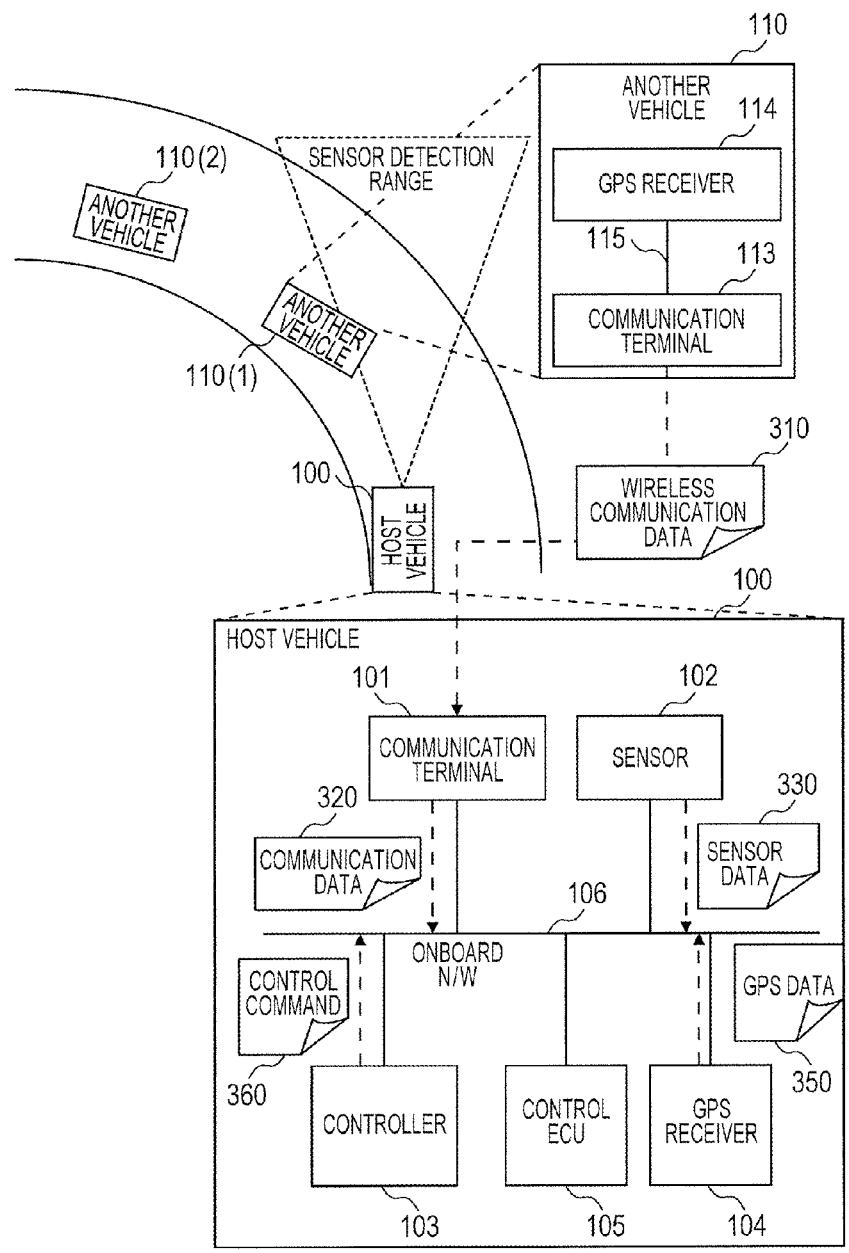
FIG. 1 shows an example of system configuration of a safety driver assistance system.

FIG. 1 is a diagram showing an example of configuration, and a case of application to a curve, of a safety driver assistance system using a sensor as a detector device for other vehicles and a communication terminal for wireless communication. As shown in FIG. 1, the safety driver assistance system has on a host vehicle 100 a communication terminal 101 for communication by the host vehicle 100 with outside, a sensor 102 for detecting any vehicle around the host vehicle 100, and a controller 103 for integrating data acquired by the communication terminal 101 and the sensor 102. This embodiment will be described with respect to the communication terminal 101 and the sensor 102 as example of a plurality of detector devices (devices for detecting other vehicles) differing in characteristics.

Another vehicle 110 has a communication terminal 113 and, using the communication terminal 113, regularly transmits wireless communication data 310 around. The other vehicle 110 uses, as positional information and vehicle speed information, data outputted from a GPS receiver 114 to an onboard network 115. The onboard network 115 is a network conforming to the standards of, for instance, CAN (Controller Area Network) and FlexRay.

The host vehicle 100 further has a GPS receiver 104 for measuring the position of the host vehicle 100, a control ECU 105 for executing control over the engine and the brake, and an onboard N/W 106 for connecting various items of equipment to one another.

The communication terminal 101, when it receives wireless communication data 310 from another vehicle 110, alters the format for the onboard N/W 106, and outputs communication data 320 to the onboard N/W 106. This wireless communication data 310 is usually transmitted at hundreds of milliseconds' intervals from the same vehicle. Conversely, the communication terminal 101 transmits positional information on the host vehicle 100 in the format of the communication data 310 to vehicles nearby including the other vehicle 110. In practice, it transmits to the surroundings of the host vehicle 100.

The sensor 102 outputs information on the detected vehicles around to the onboard N/W 106 as sensor data 330. The sensor data 330 includes, in addition with the relative positions and relative speeds of the detected vehicles around, reliability as to whether the vehicles themselves may be erroneously detected. The sensor data 330 from the sensor 102 is periodically outputted. For instance, nearby vehicle information detected every 100 milliseconds (the sensor data 330) is outputted. The sensor 102 is, for instance, a milli-wave laser radar.

The GPS receiver 104 converts received GPS information into GPS data 350 and outputs it to the onboard N/W 106.

The controller 103 inputs from the onboard N/W 106 the communication data 320, the sensor data 330 and the GPS data 350, integrates these items of information on vehicles nearby, executes an application on the basis of the information, and outputs a control command 360 for alarming and control to the onboard N/W 106. The application executed by the controller 103, for instance, figures out any risk of rear-end collision from the distance and speed relative to the vehicle ahead, and outputs the control command 360 so as to control for a slower speed if there is any risk of rear-end collision.

The control ECU 105 inputs the control command 360 from the onboard N/W 106, and controls (equipment mounted on) the host vehicle 100 in accordance with the control command 360. The control ECU 105 is, for instance, an engine controller, a brake controller or a transmission controller.

FIG. 1 shows a situation where another vehicles 110 is running in the same direction as the host vehicle 100 and that other vehicle 110 is running near still another vehicle 110 (1), a curve prevents the other vehicle 110 from being fully covered by the detection range of the sensor 102 mounted in the forward part of the host vehicle 100 (shown) and, when the other vehicle 110 is running near yet another vehicle 110 (2) (the host vehicle 100 is running near 110 (1) in the diagram), the other vehicle 110 is contained in the detection range of the sensor 102 (not shown to avoid complexity). In such a curve scene, when the other vehicle 110 is outside the detection range of the sensor 102 as is the still other vehicle 110 (1), the application is executed on the basis of information obtained by the communication terminal 101 or when the other vehicle 110 has entered into the detection range of the sensor 102 as is the yet other vehicle 110 (2), the application is executed on the basis of information obtained by the sensor 102 and the communication terminal 101. Especially on a curve such as the one shown in FIG. 1, motions in the lateral direction of the detection range of the sensor 102 are significant and the other vehicle 110 tends to go out of the detection range of the sensor 102, and interlocking with information obtained by the communication terminal 101 proves effective for the execution of the application.

Figure 2:
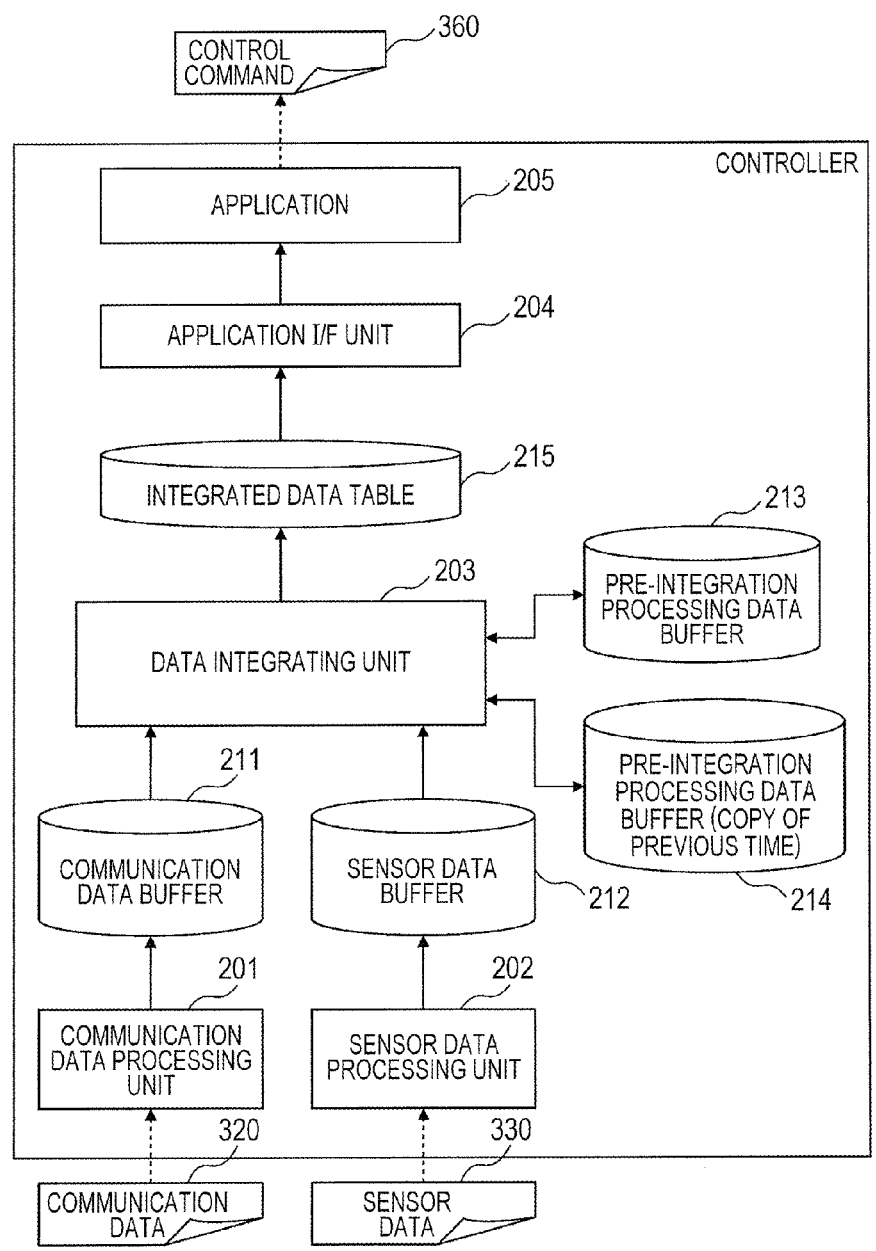
FIG. 2 is a functional configuration diagram of a controller.

FIG. 2 is a diagram showing the functional configuration of the controller 103. The controller 103 has a communication data processing unit 201 that processes the communication data 320 outputted from the communication terminal 101, a sensor data processing unit 202 that processes the sensor data 330 outputted from the sensor 102, a data integrating unit 203 that integrates the communication data 320 and the sensor data 330 respectively processed by the communication data processing unit 201 and the sensor data processing unit 202, an application I/F unit 204 that so provides an API as to facilitate utilization of the integrated data from the application, and an application 205 that actually utilizes the data. Incidentally, the data integrating unit 203 periodically executes at prescribed time steps. Further, it has a communication data buffer 211 that holds data processed by the communication data processing unit 201, a sensor data buffer 212 that holds data processed by the sensor data processing unit 202, a pre-integration processing data buffer 213 that temporarily holds data converted for data integration by the data integrating unit 203, a pre-integration processing data buffer (copy of previous time) 214 that holds the contents of the pre-integration processing data buffer 213 at the immediately preceding time step (previous time), and an integrated data table (hereinafter referred to as the integrated data) 215 that holds the result of data integration.

The communication data processing unit 201 executes when the communication data 320 outputted from the communication terminal 101 is received, and the contents of the communication data 320 are stored into the communication data buffer 211. In this process, the communication data transmitted from the same other vehicle may either be stored into the communication data buffer 211 in an overwriting way, or undergo smoothing or filtering to obtain the average by the use of communication data received in the past to compensate for any error in positional information. Further, when filtering is to be executed, the duration of consecutive inputting of communication data from the same vehicle is figured out, and the figured-out duration is also stored into the communication data buffer 211.

The GPS data 350 received from the GPS receiver 104, like the communication data 320 received from the communication terminal 101, is stored by the communication data processing unit 201 into the communication data buffer 211. In the case of the GPS data 350, as in the case of the communication data 320, filtering may be executed by the use of GPD data received in the past to compensate for any error in positional information.

The sensor data processing unit 202 executes at the timing of reception of the sensor data 330 outputted from the sensor 102, and the contents of the sensor data 330 are stored into the sensor data buffer 212. As the sensor 102 regularly outputs detected vehicle information as a data set, either overwriting may be done after deleting past data recorded in the sensor data buffer 212 or, like the communication data processing unit 201, filtering may be executed to figure out the duration of consecutive inputting of sensor data from the same vehicle and the figured-out duration may be stored into the sensor data buffer 212.

The data integrating unit 203 executes periodically, and integrates the contents of the communication data buffer 211 and of the sensor data buffer 212 to generate the integrated data 215. In order to generate the integrated data 215, the data integrating unit 203 extrapolates information in the communication data buffer 211 to the timing of integration, at the same time converts the coordinate system into a relative coordinate system, and stores the result into the pre-integration processing data buffer 213. Similarly, information in the sensor data buffer 212 is also extrapolated to the timing of integration, and the result is stored into the pre-integration processing data buffer 213. Identification is processed on the basis of the pre-integration processing data buffer 213 generated in this way to produce the integrated data 215. The identification processing is accomplished with reference to, for instance, whether the positional deviation is within a threshold value or the deviation of the vehicle speed vector is within a threshold value. Also, as data having been acquired a long time ago is poor in reliability, whether it can be an object of identification processing at all is also carried out by the data integrating unit 203. Since this means, for instance, that it will be judged not to use information on a vehicle having moved out of the communicable range and been unable to communicate for a long period or that the reliability of relative values drops when the GPS data 350 of the host vehicle is impossible to be acquired for a long period on account of entering a tunnel or otherwise, the integrated data 215 is generated by using only the sensor data 330 without using the communication data 320. When past data sets are to be used for generating the integrated data 215, the past data sets are copied in advance into the pre-integration processing data buffer 214.

The application I/F unit 204 provides a library that facilitates utilization of the integrated data 215 from each application 205. For instance, it provides a data set organized by sorting data in the order of relative proximity to the host vehicle or a data set organized by sorting data in the order of earliness of timing of possible collision against the host vehicle.

The application 205 is a safety application using the integrated data 215 based on the sensor data 330 and the communication data 320. For instance, it is an application that, upon detecting a risk of collision against the vehicle ahead, generates a control command and a command to slow down, and outputs the command to the onboard N/W 106 or an application that, upon detecting a risk of collision at an intersection, outputs alarm information to the onboard N/W 106.

The communication data buffer 211 holds GPS information on the host vehicle 100 and the communication data 320 received from another vehicle 110, and that communication data 320 is driving status information of the host vehicle 100 or the other vehicle 110 including the latitude, longitude and speed vector of the host vehicle or the other vehicle. So that the reliability of data can be grasped, the data may include the time of data generation and how long data has been received consecutively since data acquisition from the same vehicle began.

The sensor data buffer 212 holds the sensor data 330 detected by the sensor 102, and that sensor data 330 is driving status information of another vehicle 110 with reference to the host vehicle 100, including the relative positions and relative speed vectors of vehicles around. The data may include the duration of time indicating how long detection has been consecutively made since the detection began so that the reliability of data can be grasped.

The pre-integration processing data buffer 213 stores temporary data for generating the integrated data 215. This temporary data is generated from data stored in the communication data buffer 211 and the sensor data buffer 212, and includes information on relative coordinates and relative speed vector. It also includes a value indicating which of the sensor data 330 and the communication data 320 is the original data.

The pre-integration processing data buffer (copy of previous time) 214 stores a data set copying the data stored in the pre-integration processing data buffer 213 at the immediately preceding time step. Before the data integrating unit 203 generates the pre-integration processing data buffer 213 from the contents of the communication data buffer 211 and the sensor data buffer 212, it is copied by the data integrating unit 203 from the pre-integration processing data buffer 213 into the pre-integration processing data buffer (copy of previous time) 214.

The integrated data 215 is a data set integrating information on vehicles around obtained by the sensor 102 and the communication terminal 101 and includes the relative positions and relative speeds of the vehicles around.

Figure 3A:
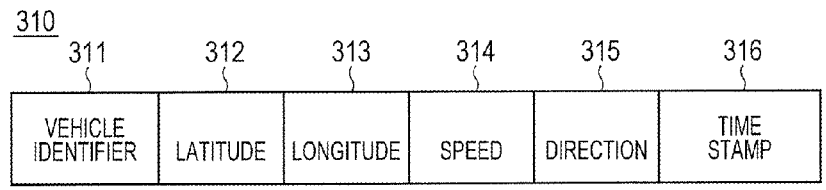
FIG. 3A shows a data format of wireless communication data.

FIG. 3A shows the wireless communication data 310 transmitted and received between the host vehicle 100 and another vehicle 110. The wireless communication data 310 includes a vehicle identifier 311, a latitude 312, a longitude 313, a speed 314, a direction 315 and a time stamp 316.

The vehicle identifier 311 is an identifier that can uniquely identify a vehicle that transmits (transmitting vehicle of) the communication data 310. The latitude 312 and the longitude 313 represent the absolute position of the transmitting vehicle acquired by the GPS receiver 114. The speed 314 represents the speed of the transmitting vehicle generated on the basis of vehicle speed pulse information flowing over the onboard network 115. The direction 315 represents the direction of the speed vector of the transmitting vehicle (0.0 degree indicates the northern direction) generated by the GPS receiver 114 or a gyro. The time stamp 316 represents the time when the positional information including the latitude 312 and the longitude 313 and the vehicle speed (speed and direction) information was generated, the time when GPS information was received by the GPS receiver 114. When the positional information is compensated with the vehicle speed information or the like, it represents the time when the compensation was executed.

Figure 3B:
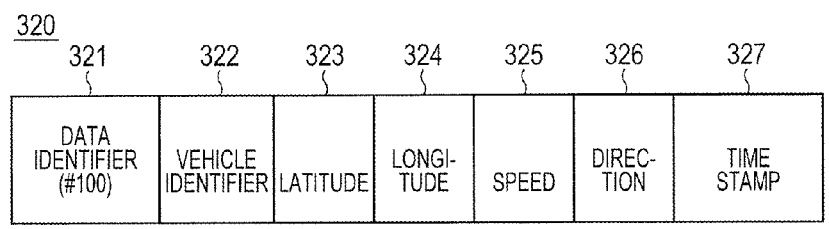
FIG. 3B shows a data format of communication data.

FIG. 3B shows the communication data 320 outputted from the communication terminal 101 to the onboard N/W 106 and acquired by the communication terminal 101 from another vehicle 110. The communication data 320 includes a data identifier 321, a vehicle identifier 322, a latitude 323, a longitude 324, a speed 325, a direction 326 and a time stamp 327.

The data identifier 321 is an identifier indicating that the data is the communication data 320. The vehicle identifier 322, the latitude 323, the longitude 324, the speed 325, the direction 326 and the time stamp 327 are respectively the vehicle identifier 311, the latitude 312, the longitude 313, the speed 314, the direction 315, and the time stamp 316 of the wireless communication data 310. In other words, the communication data 320 is a data obtained by adding the data identifier 321 to the wireless communication data 310.

Figure 3C:
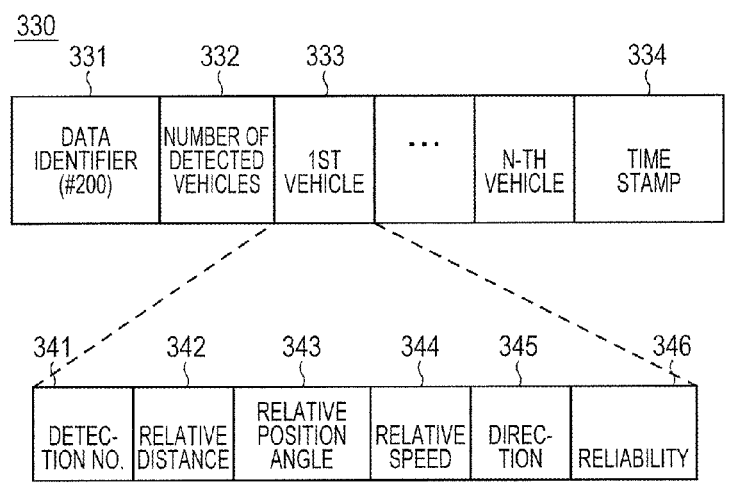
FIG. 3C shows a data format of sensor data.

FIG. 3C shows the sensor data 330 outputted from the sensor 102 to the onboard N/W 106 and representing information on vehicles around detected by the sensor 102. The sensor data 330 includes a data identifier 331, the number of detected vehicles 332, detected vehicle information 333 equivalent to the number (N) of detected vehicles 332 and a time stamp 334. The detected vehicle information 333 includes a detection number 341, a relative distance 342, a relative position angle 343, a relative speed 344, a direction 345 and reliability 346.

The data identifier 331 is an identifier indicating that this data is the sensor data 330. The number of detected vehicles 332 indicates the number of vehicles detected by the sensor 102. As many sets of detected vehicle information 333 as a number (N) set as the number of detected vehicles 332 exist, and each indicates the relative position and the relative speed of one detected vehicle. The time stamp 334 indicates the time at which the sensor 102 executed detection of vehicles around.

The detection number 341 is an ID number assigned to a vehicle detected by the sensor 102, and if the vehicle is determined to be the same as a vehicle detected by the sensor 102 in the past, the same number is used. The relative distance 342 indicates the relative distance, detected by the sensor 102, between the host vehicle 100 and the pertinent vehicle. The relative position angle 343 indicates the degree of angle at which the pertinent vehicle detected by the sensor 102 is with reference to the traveling direction of the host vehicle 100. It is expressed, for instance, in the degree of angle clockwise with reference to the traveling direction of the host vehicle 100. The relative speed 344 indicates the level of the relative speed of the pertinent vehicle detected by the sensor 102 with reference to the speed of the host vehicle 100. The direction 345 indicates, with respect to the relative speed of the pertinent vehicle detected by the sensor 102, the direction in which it is headed. It is expressed, for instance, in the degree of angle clockwise with reference to the traveling direction of the host vehicle. The reliability 346 indicates whether detected information on the pertinent vehicle can be erroneous. "0" indicates that it can be erroneous, and "1" indicates that it cannot be erroneous. For instance, if detection continues for a longer period than a predetermined threshold value, "1" is set to indicate that no erroneous detection is possible, or if it continues for a period not longer than the threshold value, "0" is set to indicate that erroneous detection is possible. The reason is that, as noise may cause the sensor 102 to make erroneous detection and, unless detection is continued for a certain period of time, the absence of erroneous detection cannot be determined. The sensor data 330 is outputted every time the sensor 102 periodically scans vehicles around.

Figure 3D:
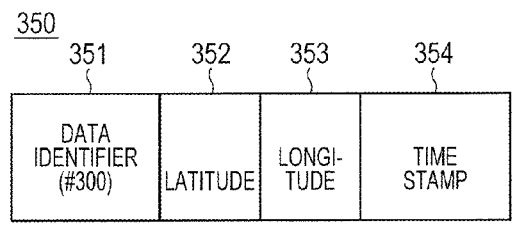
FIG. 3D shows a data format of GPS data.

FIG. 3D shows the GPS data 350 outputted from the GPS receiver 104 to the onboard N/W 106. The GPS data 350 includes a data identifier 351, a latitude 352, a longitude 353 and a time stamp 354.

The data identifier 351 is an identifier indicating that this data is the GPS data 350. The latitude 351 represents the latitude of the absolute position of the host vehicle 100 obtained by reception of a radio wave from a GPS satellite by the GPS receiver 104. The longitude 352 represents the longitude of the absolute position of the host vehicle 100 obtained by reception of the radio wave from the GPS satellite by the GPS receiver 104. The time stamp 359 indicates the time when the absolute position of the host vehicle 100 was generated by the GPS receiver 104 on the basis of the radio wave from the GPS satellite.

Figures 3E, 4, 5:
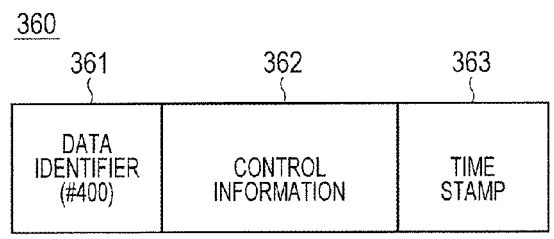
FIG. 3E shows a data format of a control command.
FIG. 4 shows the configuration of a communication data buffer.
FIG. 5 shows the configuration of a sensor data buffer.

FIG. 3E shows the control command 360 generated by an application of the controller 103, outputted to the onboard N/W 106 and used by the control ECU 105 having received the command. The control command 360 comprises a data identifier 361, control information 362 and a time stamp 363.

The data identifier 361 is an identifier indicating that this data is the control command 360. The control information 362 specifically states a control command to be executed by the control ECU 105. The time stamp 363 indicates the time when the pertinent control command 360 was generated. For instance, when a collision-preventive application of the controller 103 detects a risk of collision against the vehicle ahead, a control command of "Slow down" is stated in the control information 362.

FIG. 4 shows the configuration of the communication data buffer 211. In the communication data buffer 211, the communication data 320 including the vehicle identifier 322, the latitude 323, the longitude 324, the speed 325, the direction 326 and the time stamp 327 is stored as the vehicle identifier 401, the latitude 402, the longitude 403, the speed 404, the direction 405 and the time stamp 406, and further a detection duration 407, which represents the period of continuation of the communication data 320 received from the same vehicle, is stored. Also, the GPS data 350 outputted from the GPS receiver 104 of the host vehicle 100 is stored into the communication data buffer 211 similarly to the communication data 320 with "#0000" as the vehicle identifier.

The detection duration 407 indicates how long detection of the pertinent vehicle has continued. When the communication data 320 indicating the pertinent vehicle is received by the controller 103 for the first time, 0 is set. Upon the second or later reception, a value augmented with a difference in time length from the immediately preceding reception time is set. However, if the lapse of time since the last reception is equal to or longer than the immediately preceding reception, it is reset to 0.

FIG. 4 shows a state in which GPS information on the host vehicle 100 and three other vehicles are detected by communication.

The first line shows positional information on the host vehicle 100 whose vehicle identifier is #0000. The absolute position of the host vehicle 100 derived from the GPS data 350 is calculated to be 35.00000 degrees in latitude and 140.00000 degrees in longitude. Further, the speed 404 is 16.7 [m/s] (about 60 km/h) and the traveling direction is 0.0 (degree), indicating straight travel in the northern direction. Since the time stamp representing the GPS-based positional information generation time is indicated to be 0003200 (the unit of time is millisecond, for instance) and, as the detection duration is 3000, it is indicated that the GPS data 350 was successfully acquired consecutively from 200 until 0003200.

The second line shows the communication data 320 based on the wireless communication data 310 from another vehicle 110 whose vehicle identifier is "#0010". The absolute position of the other vehicle 110 is 35.00020 degrees in the latitude 402, 139.9998 degrees in the longitude 403, 16.7 [m/s] (about 60 km/h) in the speed 404 and 170.0 degrees in the traveling direction, indicating an approach to the host vehicle 100 in substantially the southern direction.

The third line shows the communication data 320 based on the wireless communication data 310 from still another vehicle 110 whose vehicle identifier is "#0020". The absolute position of this other vehicle 110 is 35.00050 degrees in the latitude 402, 139.9992 degrees in the longitude 403, 16.7 [m/s] (about 60 km/h) in the speed 404 and 340.0 degrees in the traveling direction substantially northward, indicating substantially similar to the host vehicle 100 both in traveling direction and in speed.

The fourth line shows the communication data 320 based on the wireless communication data 310 from yet another vehicle 110 whose vehicle identifier is "#0030". The absolute position of this other vehicle 110 is 35.00121 degrees in the latitude 402, 139.99940 degrees in the longitude 403, 8.5 [m/s] (about 30 km/h) in the speed 404 and 300.0 degrees in the traveling direction substantially northeastward, indicating traveling at low speed away from the host vehicle 100.

FIG. 5 shows the configuration of the sensor data buffer 212. The sensor data buffer 212 includes a detection number 501, a relative distance 502, a relative position angle 503, a relative speed 504, a direction 505 and a detection duration 506.

For the detection number 501, the same number is allocated as long as the sensor 102 continuously detects the same object, and this same value is shown. The relative distance 502 indicates the relative distance between the host vehicle 100 and an object vehicle (detected other vehicle 110) as detected by the sensor 102. The relative position angle 503 indicates the directional angle clockwise of the position of the object vehicle detected by the sensor 102 with reference to the traveling direction of the host vehicle 100. The relative speed 504 indicates the level of the relative speed of the object vehicle as detected by the sensor 102 with reference to the host vehicle 100. The direction 505 indicates the directional angle clockwise of the position of the object vehicle as detected by the sensor 102 with reference to the traveling direction of the host vehicle 100. The detection duration 506 indicates the length of time during which the sensor 102 has been continuously detecting the object vehicle. This value is added on as long as data bearing the same detection number 501 is consecutively inputted, and is reduced to 0 at the timing of discontinuation of the input.

In the case of FIG. 5, one vehicle is being detected. It is indicated that the vehicle under detection is "#S01" in the detection number 501, 20.0 [m] in the relative distance 502, 354.3 degrees in the relative position angle 503, 32.0 [m/s] in relative speed, 175.0 degrees in the direction 505, and 1000 [ms] in the detection duration 506.

FIG. 6 shows the configuration of the pre-integration processing data buffer 213. The pre-integration processing data buffer 213 stores a vehicle identifier/sensor detection number 601, a relative distance 602, a relative position angle 603, a relative speed 604, a direction 605, a time stamp 606, a detection duration 607, a source 608 and a detection status 609.

As the vehicle identifier/sensor detection number 601, the value of the vehicle identifier 401 in the communication data buffer 211 is stored when based on the communication data buffer 211, or the value of the detection number 501 of the sensor data buffer 212 is stored when based on the sensor data buffer 212. By the applicable one of these values, the detected vehicle (the detected other vehicle 110) is identified.

The relative distance 602 indicates the relative distance between the host vehicle 100 and the detected vehicle. When it is based on the communication data buffer 211, a relative distance figured out from the difference from the position of the host vehicle 100 whose vehicle identifier 401 is "#000" is stored after time correction of the latitude 402 and the longitude 403 of the communication data buffer 211 to the current time. When it is based on the sensor data buffer 212, a value resulting from time correction of the relative distance 502 of the sensor data buffer 212 to the current time is stored.

The relative position angle 603 indicates in what direction the detected vehicle is as viewed from the host vehicle 100. This angle indicates the angle clockwise of the direction with reference to the traveling direction of the host vehicle 100. When it is based on the communication data buffer 211, a value calculated from the traveling direction of the host vehicle 100 regarding the relative position figured out from the difference from the position of the host vehicle 100 whose vehicle identifier 401 is "#0000" is stored after time correction of the latitude 402 and the longitude 403 of the communication data buffer 211 to the current time. When it is based on the sensor data buffer 212, a value resulting from time correction of the relative position angle 503 of the sensor data buffer 212 to the current time is stored.

The relative speed 604 indicates the level of the relative speed between the host vehicle 100 and the detected vehicle. When it is based on the communication data buffer 211, the magnitude of a relative speed vector figured out from the difference between a speed vector obtained from the speed 404 and the direction 405 of pertinent data in the communication data buffer 211 and the speed vector of the host vehicle 100 obtained from the speed 404 and the direction 405 of the host vehicle 100 whose vehicle identifier 401 is "#0000" is stored. When it is based on the sensor data buffer 212, the speed 404 of the sensor data buffer 212 is stored.

The direction 605 indicates the direction of the relative speed between the host vehicle 100 and the detected vehicle. This angle indicates the angle clockwise of the direction with reference to the traveling direction of the host vehicle 100. When it is based on the communication data buffer 211, a relative speed vector figured out from the traveling direction of the host vehicle 100 regarding the difference between a speed vector obtained from the speed 404 and the direction 405 of pertinent data in the communication data buffer 211 and the speed vector of the host vehicle 100 obtained from the speed 404 and the direction 405 of the host vehicle 100 whose vehicle identifier 401 is "#0000" is stored. When it is based on the sensor data buffer 212, the direction 405 of the sensor data buffer 212 is stored.

The time stamp 606 indicates the time stamp of the time when the pertinent data was detected. When it is based on the communication data buffer 211, it is the value of the time stamp 406 of the data on which the communication data buffer 211 is based. When it is based on the sensor data buffer 212, it is the value indicating the time when the sensor data 330 was inputted last.

The detection duration 607 indicates how long the data of the applicable vehicle identifier/sensor detection number 601 has been consecutively inputted continuously. When it is based on the communication data buffer 211, it is the value of the detection duration 407 on which the communication data buffer 211 is based. When it is based on the sensor data buffer 212, it is the value of the detection duration 506 of the data on which the sensor data buffer 212 is based.

The source 608 indicates whether the data of the communication data buffer 211 of the data of the sensor data buffer 212 is based on. When the communication data buffer 211 is based on, "2 (communication)" is set. When the sensor data buffer 212 is based on, "1 (sensor)" is set.

The detection status 609 indicates whether the pertinent data has been used in integration processing. Two different statuses exist, including "0 (undetected)" and "1 (detected)". At the timing of generation of the pre-integration processing data buffer 213 by the data integrating unit 203 on the basis of the communication data buffer 211 and the sensor data buffer 212, "0 (undetected)" is set. After that, when processing by the data integrating unit 203 is executed to cause the pertinent data to be reflected in the integrated data 215, it is rewritten to "1 (detected)".

FIG. 6 shows that four kinds of detected information are stored in the pre-integration processing data buffer 213. For instance, the first line is data generated on the basis of the communication data buffer 211, in which the vehicle identifier 601 is "#000010", the relative distance 602 from the host vehicle 100 is 25.0 [m], the relative position angle 603 is 354.3 degrees, the relative speed 604 which is the level of relative speed is 32.0 [m/s], the direction is at 175.0 degrees, the time stamp 606 indicating the time of detection is "0003120", the detection duration 607 is 2000 [ms], and the detection status 609 is "0 (undetected)" indicating that the detected information is not yet reflected in the integrated data 215.

FIG. 7 shows setting of the integrated data 215. The integrated data 215 stores a vehicle identifier 701, a sensor detection number 702, a relative distance 703, a relative position angle 704, a relative speed 705, a direction 706 and a status 707.

The vehicle identifier 701 uses, when the communication data buffer 211 is based on, the vehicle identifier 401 of the communication data buffer 211 so as to distinguish the vehicle the information on which is the basis. If the communication data buffer 211 is not based on and the data has been generated solely by the sensor, "-" is stored in the column of the vehicle identifier 701.

The sensor detection number 702 uses, when the sensor data buffer 212 is based on, the detection number 501 of the sensor data buffer 212 so as to distinguish the vehicle the information on which is the basis. If the sensor data buffer 212 is not based on and the data has been generated solely by communication, "-" is stored in the column of the sensor detection number 702.

The relative distance 703 indicates the relative distance between the host vehicle 100 and a detected vehicle. The relative position angle 704 indicates the direction of the detected vehicle as viewed from the host vehicle 100. This angle indicates the degree of angle clockwise of the direction with reference to the traveling direction of the host vehicle 100. The relative speed 705 indicates the level of the relative speed between the host vehicle 100 and the detected vehicle. The direction 705 indicates the direction of the relative speed between the host vehicle 100 and the detected vehicle. This angle indicates the degree of angle clockwise of the direction with reference to the traveling direction of the host vehicle 100. When the relative distance 703, the relative position angle 704, the relative speed 705 and the direction 706 are generated on the basis of information solely of the communication data buffer 211 or information solely of the sensor data buffer 212, the values of the relative distance 602, the relative position angle 603, the relative speed 604 and the direction 605 of the pertinent detected vehicle in the pre-integration processing data buffer 213 are stored. On the other hand, when information of both the communication data buffer 211 and the sensor data buffer 212 is used, values resulting from mixing (addition, averaging or the like with prescribed weights) of the relative distances 602, the relative position angles 603, the relative speeds 604 and the directions 605 of data on two detected vehicles in the pre-integration processing data buffer 213 are stored.

The status 707 indicates the identified status of data. There are five different statuses including "#00 (undetected)", "#01 (communication only)", "#02 (sensor only)", "#03 (being identified)" and "#04 (lost after identified)". "#00 (undetected)" indicates that the pertinent data is detected by neither communication nor the sensor. This value represents a status that may be temporarily set during processing by the data integrating unit 203, and data in which this value is set is deleted ultimately. "#01 (communication only)" indicates that the pertinent data is detected only by communication. "#02 (sensor only)" indicates that the pertinent data is detected only by the sensor. "#03 (being identified)" indicates that the pertinent data is detected by both the sensor and communication. "#04 (lost after identified)" indicates that the pertinent data was once detected by both the sensor and communication but is now lost by the sensor. When this status has lasted for a period not less than a certain length of the relative position and the relative speed have varied to or beyond a certain extent, it is altered to "#01 (communication only)" by processing accomplished by the data integrating unit 203.

Figure 8:
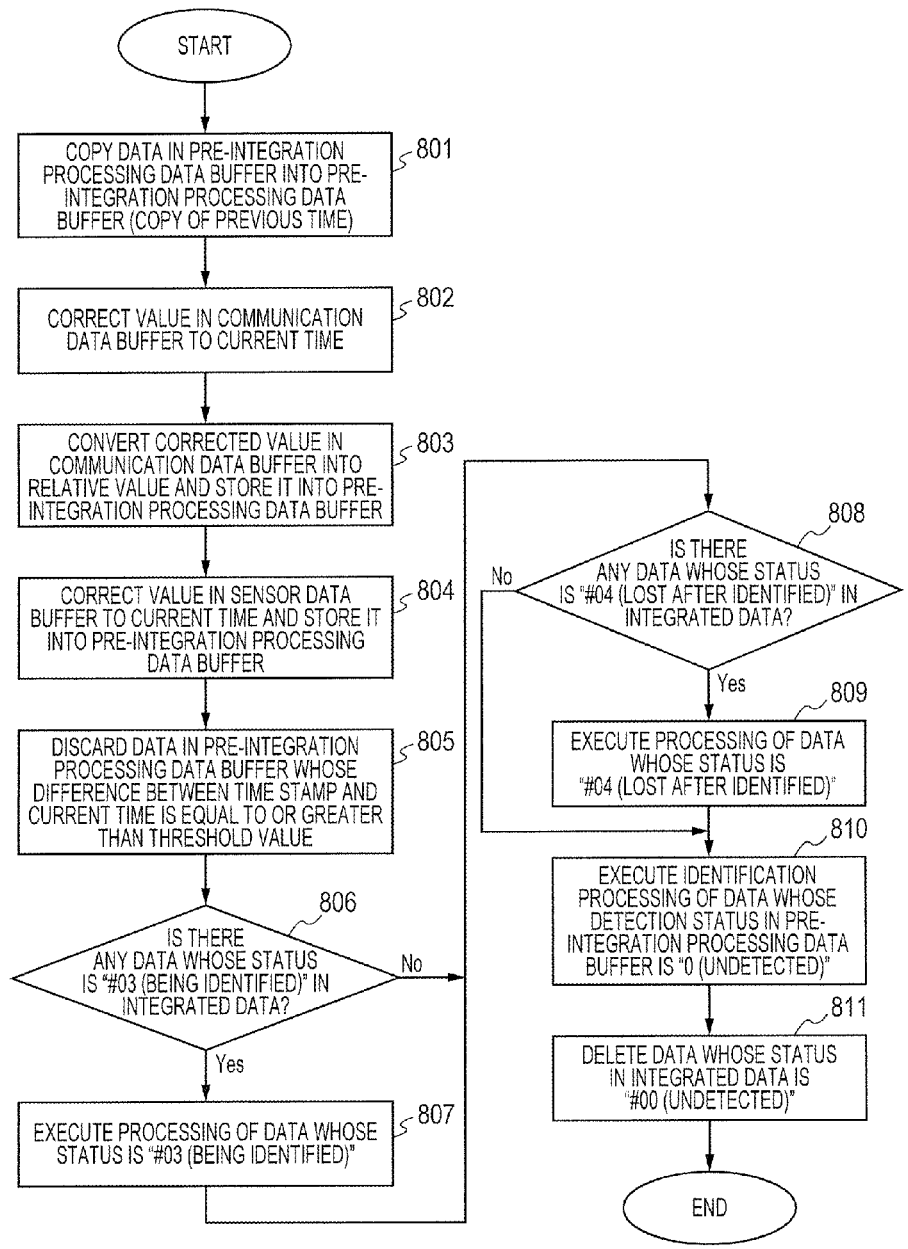
FIG. 8 is a flow chart of processing by an integration processing unit.

FIG. 8 shows a flow chart of processing by the data integrating unit 203. As the data integrating unit 203 is periodically actuated at prescribed intervals of time, data in the pre-integration processing data buffer 213 (the data at the end of processing when it was last actuated) is copied into the pre-integration processing data buffer (copy of previous time) 214 (801).

Data in the communication data buffer 211 is read in, and the value is corrected to the current time (802). As one of possible methods of correction, for instance, the absence of speed change being supposed, the latitude 402 and the longitude 403 are corrected according to the difference between the current time and the time stamp 406 and to the relative speed 404 and the direction 405. Then, conversion to relative values is accomplished by causing the vehicle identifier 401 to figure out the difference from the data of the host vehicle 100 of "#0000", and the relative values are stored into the pre-integration processing data buffer 213 (803). At this step, as the time stamp 606, smaller values (older values) of the pertinent vehicle and the host vehicle 100 are used, and as the detection duration 607, too, smaller values of the pertinent vehicle and the host vehicle 100 are used. Into the source 608, "2 (communication)" is stored, and into the detection status 609, "0 (undetected)" is stored.

Data in the sensor data buffer 212 is read in, and the values are corrected to the current time and stored into the pre-integration processing data buffer 213 (804). At this step, "1 (sensor)" is stored into the source 608, and "0 (undetected)" is stored into the detection status 609. Out of the data items stored into the pre-integration processing data buffer 213 here, those in which the difference between the time stamp 606 and the current time is equal to or greater than a predetermined threshold value are discarded on account of their poor reliability (805).

The integrated data 215 is referenced to check if there is no data whose status 707 is "#03 (being identified)" (806). If there is such data, processing for "#03 (being identified)" is executed (807). Details of the processing for "#03 (being identified)" will be described afterwards with reference to the flow chart of FIG. 9. In the absence of such data, the processing advances to step 808.

It is checked if there is "#04 (lost after identified)" in the integrated data 215 (808). If there is such data, processing for "#04 (lost after identified)" is executed (809). Details of the processing for "#04 (lost after identified)" will be described afterwards with reference to the flow chart of FIG. 10. In the absence of such data, the processing advances to step 810.

The detection status 609 of the pre-integration processing data buffer 213 executes processing for data identification of "0 (undetected)" (810). Details of the processing for identification will be described afterwards with reference to the flow chart of FIG. 11. The integrated data 215 is searched for any data whose status 707 is "#00 (undetected)" and, if there is any such data, the pertinent data is deleted (811) to end the processing by the data integrating unit 203.

Figure 9:
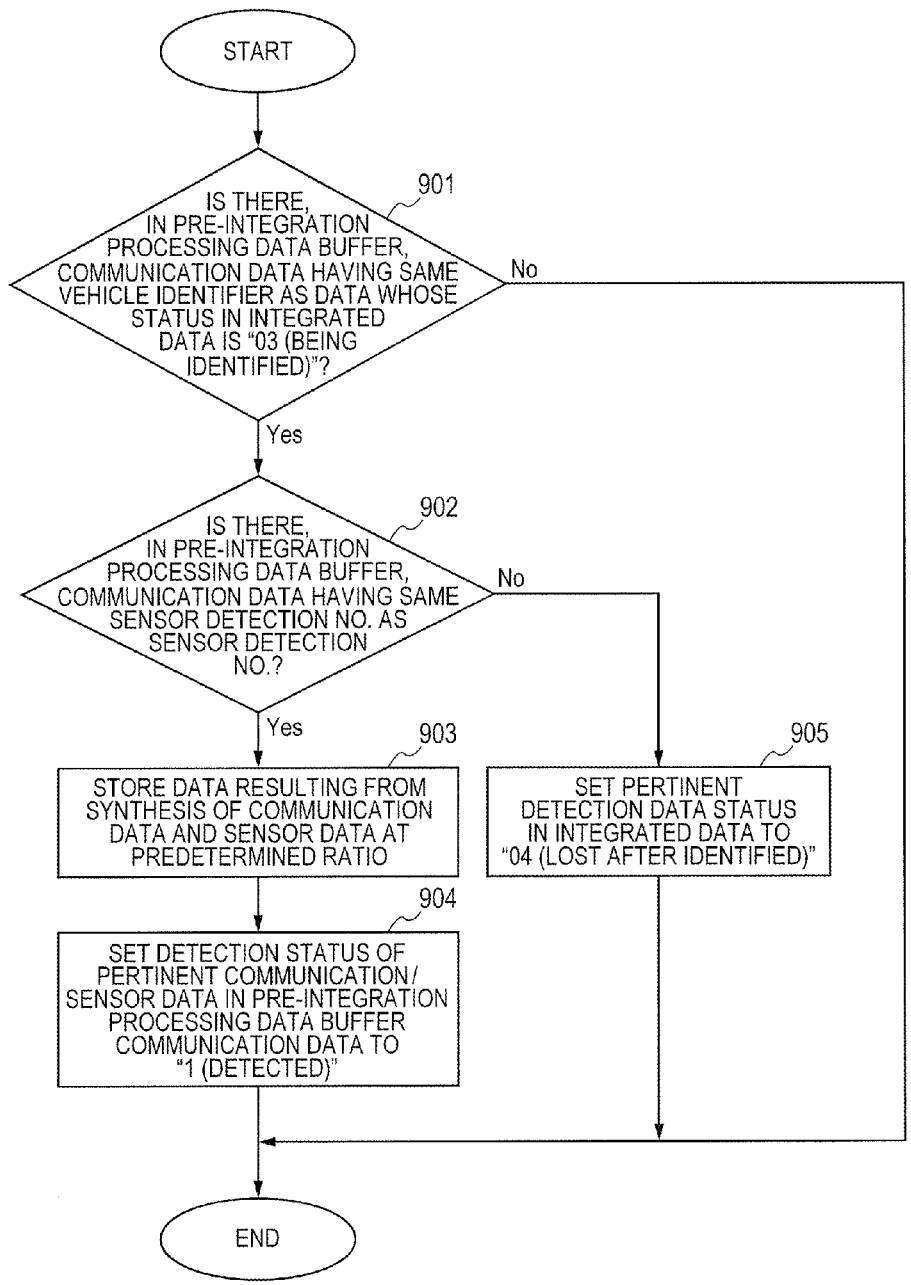
FIG. 9 is a flow chart of processing of data being identified.

FIG. 9 shows a detailed flow chart of processing of data whose status 707 in the integrated data 215 is "#03 (being identified)" (807 in FIG. 8). The pre-integration processing data buffer 213 is searched for any data having the same vehicle identifier 601 as the data whose status 707 in the integrated data 215 is "#03 (being identified)" (901). In the absence of such data, the processing is ended. If there is any such data, the pre-integration processing data buffer 213 is searched for any data having the same sensor detection number 601 as the sensor detection number 702 of the pertinent data in the integrated data 215 (902). In the absence of such data, the sensor detection number 702 is set to "-" with respect to the pertinent data in the integrated data 215, and the status 707 is set to "#04 (lost after identified)" (905). If there is any data pertinent to step 902, the values of corresponding communication data and sensor data in the pre-integration processing data buffer 213 are synthesized in a preset ratio and stored into the integrated data 215 (903). This ratio, if for instance the sensor data can be relied upon 100%, is set to communication:sensor=0:100, and the value of the sensor data is stored as it is. With respect to pertinent communication data or sensor data in the pre-integration processing data buffer 213, "1 (detected)" is stored into the detection status 609 (904) to end the processing.

Figure 10:
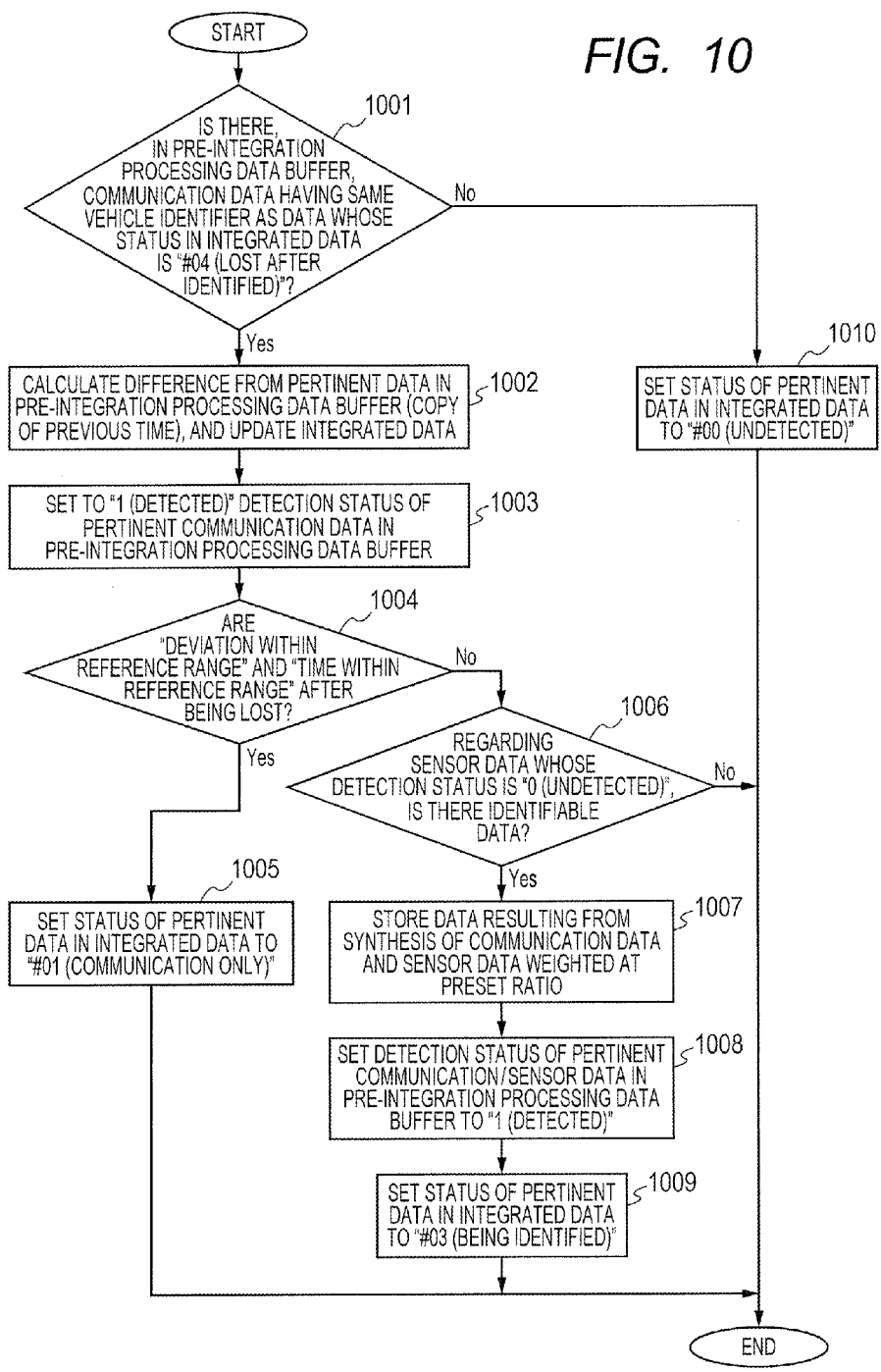
FIG. 10 is a flow chart of processing of data lost after being identified.

FIG. 10 shows a detailed flow chart of processing of data whose status 707 in the integrated data 215 is "#04 (lost after identified)" (809 in FIG. 8). The pre-integration processing data buffer 213 is searched for any data having the same vehicle identifier 601 as the data whose status 707 in the integrated data 215 is "#04 (lost after identified)" (1001). In the absence of such data, the status 707 of pertinent data in the integrated data 215 is set to "#00 (undetected)" (1010) to end the processing. If there is any such data, the difference between pertinent data in the pre-integration processing data buffer 213 and pertinent data in the pre-integration processing data buffer (copy of previous time) 214 is calculated, and the calculated difference is added to the pertinent data in the integrated data 215 (1002). The detection status 609 of the pertinent data in the pre-integration processing data buffer 213 is set to "1 (detected)" (1003).

Regarding the development after the loss of the pertinent data, it is checked whether any deviations in the position and speed vector and elapsed time are within respectively preset standard ranges (1004). If they are outside the standard ranges, the status 707 of the pertinent data in the integrated data 215 is set to "#01 (communication only)" (1005) to end the processing. If they are within the standard ranges, data whose source 608 is "1 (sensor)" and whose detection status 609 is "0 (undetected)" in the pre-integration processing data buffer 213 is checked as to whether it is identifiable (1006). Determination of whether it is identifiable is made by checking whether the difference in relative distance, the difference in relative speed and the difference in direction are within the respectively predetermined threshold values. In the absence of any identifiable data, the processing is ended.

If there is any identifiable data, the values of corresponding communication data and sensor data in the pre-integration processing data buffer 213 are synthesized in a preset ratio and stored into the integrated data 215 (1007). This ratio, if for instance the sensor data can be relied upon 100%, is set to communication:sensor=0:100, and the value of the sensor data is stored as it is. With respect to pertinent communication data and sensor data in the pre-integration processing data buffer 213, the detection status 609 is set to "1 (detected)" (1008). The status 707 of the pertinent data in the integrated data 215 is set to "#03 (being identified)" (1009) to end the processing.

Figure 11:
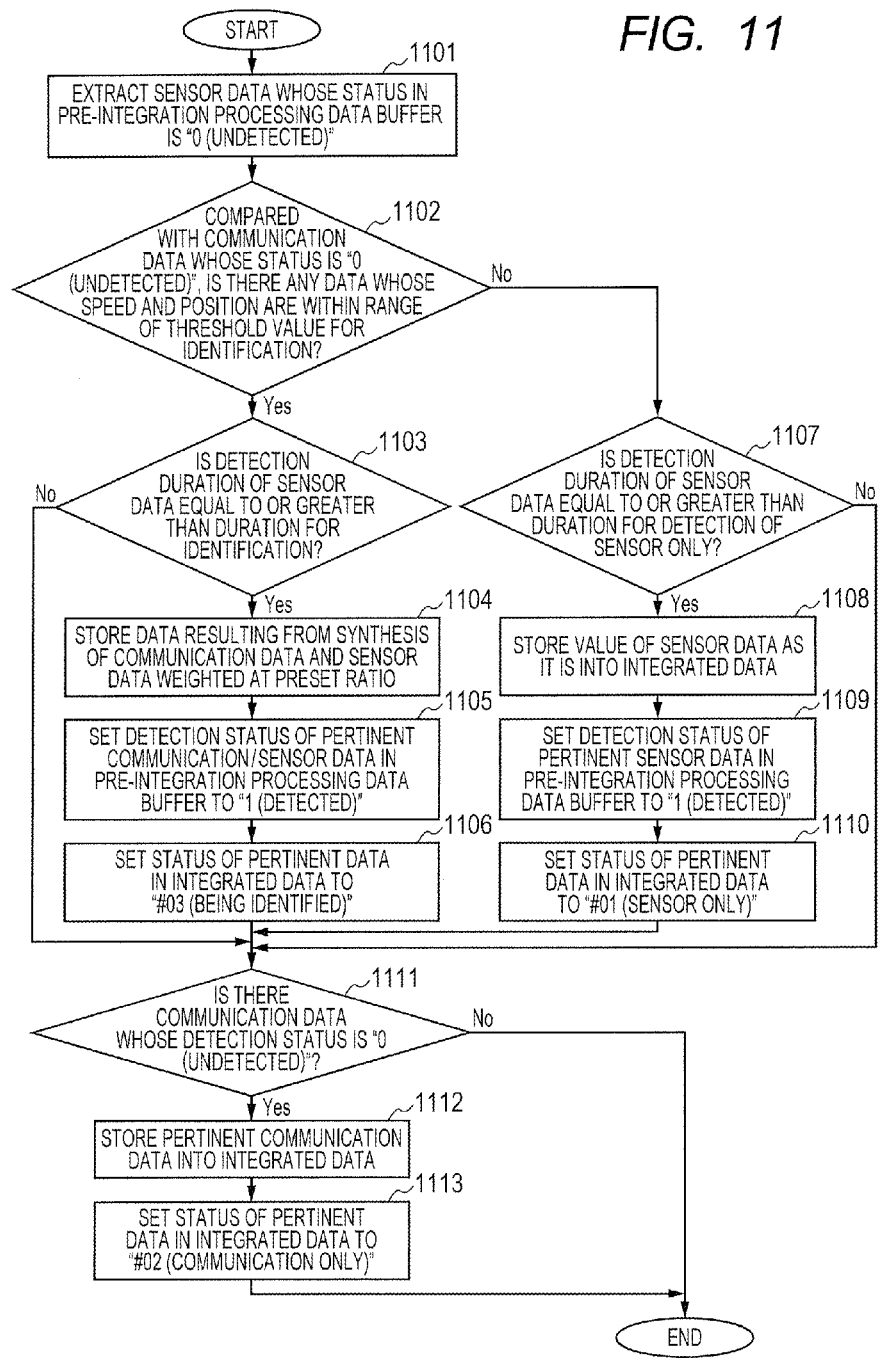
FIG. 11 is a flow chart of identification processing of undetected data.

FIG. 11 shows a detailed flow chart of identification processing of data whose detection status 609 in the pre-integration processing data buffer 213 is "0 (undetected)" (810 in FIG. 8). Data whose source 608 is "1 (sensor)" and whose detection status 609 is "0 (undetected)" is extracted from the pre-integration processing data buffer 213 (1101). Regarding the extracted data, data items whose source 608 is "2 (communication)" and whose detection status 609 is "0 (undetected)" in the pre-integration processing data buffer 213 are compared to check whether there is any identifiable data (1102). Determination of whether it is identifiable is made by checking whether the difference in relative distance, the difference in relative speed and the difference in direction are within the respectively predetermined threshold values. If there is any identifiable data, the processing advances to step 1103, of there is no identifiable data, the processing advances to step 1107.

At step 1103, it is determined whether the detection duration 607 of the extracted sensor data from the pre-integration processing data buffer 213 is equal to or greater than a predetermined threshold value for identification processing. This threshold value for identification processing is set shorter than a threshold value for processing by the sensor alone, to be described afterwards. If it is equal to or greater than threshold value, the processing advances to step 1104 or, if it is not, the processing advances to step 1111.

At step 1104, the values of the identified communication data and sensor data in the pre-integration processing data buffer 213 are synthesized in a preset ratio, and stored into the integrated data 215 (1104). This ratio, if for instance the sensor data can be relied upon 100%, is set to communication:sensor=0:100, and the value of the sensor data is stored as it is. The detection status 609 of pertinent communication data and sensor data in the pre-integration processing data buffer 213 is set to "1 (detected)" (1105). Further, the status 707 of pertinent data in the integrated data 215 is set to "#03 (being identified)" (1106), and the processing shifts to step 1111.

In the absence of identifiable data at step 1102, it is determined whether the detection duration 607 of the extracted sensor data from the pre-integration processing data buffer 213 is equal to or greater than a predetermined threshold value for detection by the sensor alone (1107). If it is equal to or greater than the threshold value, the processing advances to step 1108 or, if it is not, the processing advances to step 1111. At step 1108, the value of the extracted sensor data from the pre-integration processing data buffer 213 is stored in the integrated data as it is (1108). The detection status 609 of pertinent sensor data in the pre-integration processing data buffer 213 is set to "1 (detected)" (1109). Further, the status 707 of pertinent sensor data in the integrated data 215 is set to "#01 (sensor only)" (1110), and the processing shifts to step 1111.

Data whose source 608 is "2 (communication)" and whose detection status 609 is "0 (undetected)" is extracted from the pre-integration processing data buffer 213 (1111). In the absence of extracted data, the processing is ended. If there is any extracted data, the contents of the pertinent data are stored into the integrated data 215 (1112). The status 707 of pertinent data in the integrated data 215 is set to "#02 (communication only)" (1113) to end the processing.

As hitherto described, this embodiment enables, if there is driving status information of other vehicles from the communication terminal 101, identification of other vehicles by driving status information from the sensor 102 on such other vehicles to be accelerated even on a curve, bridge or the like.

Furthermore, even if detection by the sensor 102 is lost, once identification is accomplished by the data integrating unit 203, the status can be handled as "lost after identified" and, by correction with communication data, tracking of other vehicles can be continued. Also, by processing identification with sensor information without waiting over a long enough detection duration, return from the lost state can be accelerated. This makes possible avoidance of delays in collision prevention due to the loss of detection of the vehicle ahead by the sensor on a curve, bridge or the like.

REFERENCE SIGNS LIST

100: Host vehicle
101, 113: Communication terminal
102: Sensor
103: Controller
104, 114: GPS receiver
105: Control ECU
106, 115: Onboard N/W
110: Another vehicle
201: Communication data processing unit
202: Sensor data processing unit 203: Data integrating unit
204: Application I/F unit
205: Application
211: Communication data buffer
212: sensor data buffer
213: Pre-integration processing data buffer
214: Pre-integration processing data buffer (copy of previous time)
215: Integrated data
310: Wireless communication data
320: Communication data
330: sensor data
350: GPS data
360: Control command

The invention claimed is:

1. An onboard device comprising a controller, and when driving status information of a pertinent vehicle that is acquired from a pertinent vehicle detector device of a plurality of vehicle detector devices is prevented from continuing to be acquired from the pertinent vehicle detector device of the plurality of vehicle detector devices after the driving status information of another vehicle acquired from other vehicle detector devices of the plurality of vehicle detector devices mounted on a host vehicle and configured to detect a different vehicle than the host vehicle has been determined to be the driving status information of the same pertinent vehicle acquired from the pertinent vehicle detector device, the controller is configured to:

generate the driving status information of the pertinent vehicle by using current driving status information acquired from the other vehicle detector devices and a difference between the driving status information acquired by the pertinent vehicle detector device and the driving status information acquired by the other vehicle detector devices when the driving status information of the other vehicle acquired from the other vehicle detector devices is determined to be the driving status information of the same pertinent vehicle; and output the generated driving status information of the other vehicle, wherein a plurality of the vehicle detector devices configured to detect a different vehicle than the host vehicle include a first vehicle detector device that detects driving status information of the other vehicle according to position and vehicle speed vector information transmitted from the other vehicle by wireless communication and a second vehicle detector device that detects driving status information of the other vehicle by using a sensor, and when the driving status information of a certain other vehicle using the sensor becomes unavailable after determining, regarding a certain other vehicle, that the driving status information of a certain other vehicle using wireless communication and the driving status information of a certain other vehicle using the sensor indicate the same vehicle, the controller is further configured to output, as positional information on the pertinent vehicle, such positional information as is generated by adding a differential value of positional information of the detected information on the pertinent vehicle acquired from wireless communication to the positional information on the pertinent vehicle obtained when the sameness of the vehicle is determined.

2. An onboard device comprising a controller that determines whether items of driving status information of another vehicle acquired from a plurality of different vehicle detector devices mounted on a host vehicle to detect another vehicle indicate the same vehicle, corrects the driving status information of the other vehicle detected in the past and acquired from the plurality of different vehicle detector devices to driving status information at the time of making the determination, determines whether the two detected vehicles on the basis of whether differences in position and vehicle speed vector contained in the corrected driving status information of the other vehicle are within a range of predetermined threshold values, and outputs driving status information of the other vehicle whose sameness has been determined.

3. The onboard device according to claim 2, comprising, as the vehicle detector devices to acquire driving status information of the other vehicle, a vehicle detector device that detects driving status information of another vehicle according to position and vehicle speed vector information transmitted from the other vehicle by wireless communication and a vehicle detector device that detects driving status information of the other vehicle by using a sensor, wherein the controller, by using the difference between the time of making the determination regarding each set of the driving status information and the time of acquisition of the driving status information and position and vehicle speed vector information indicated by the driving status information, calculates the position and vehicle speed vector information at the time of making the determination.

4. A control method for a controller provided for an onboard device of a host vehicle, wherein the onboard device is provided with a controller that determines whether driving status information of another vehicle acquired from a plurality of different vehicle detector devices mounted on the host vehicle to detect the other vehicle covers the same vehicle, the controller corrects the driving status information of the other vehicle detected in the past and acquired from the plurality of different vehicle detector devices to driving status information at the time of making the determination;

the controller determines whether the same vehicle is covered based on whether differences in position and vehicle speed vector contained in the corrected driving status information of the other vehicle are within a range of predetermined threshold values, and the controller outputs the driving status information of the other vehicle when the driving status information of the other vehicle is determined to cover the same vehicle.

5. An onboard device comprising: first and second detector devices that output driving status information of another vehicle;

and a controller that determines, when the difference between first driving status information from the first detector device and second driving status information from the second detector device is equal to or less than a predetermined threshold value and a detection duration of the second driving status information from the second detector device is equal to or longer than a threshold value, which is prescribed as the period of time taken for identification, that both the first driving status information and the second driving status information are driving status information of the other vehicle, and makes the second driving status information available for use even for a shorter period than the detection duration prescribed for detection of the other vehicle by the second detector device alone.

6. The onboard device according to claim 5, comprising a controller that assigns, after both the first driving status information and the second driving status information are determined to be the driving status information of the other vehicle and when the second driving status information of the other vehicle fails to be outputted from the second detector device, the first driving status information as the driving status information of the other vehicle.

7. The onboard device according to claim 6, wherein the controller, after assigning the first driving status information as the driving status information of the other vehicle with the second driving status information of the other vehicle failing to be outputted from the second detector device, determines that both the first driving status information and the second driving status information are the driving status information of the other vehicle when the difference between the first driving status information from the first detector device and the second driving status information from the second detector device is equal to or less than a predetermined threshold value.

8. The onboard device according to claim 7, further comprising a third detector device that outputs driving status information of the host vehicle.

9. The onboard device according to claim 8, wherein: the first detector device is a communication device that receives the first driving status information, which is first absolute driving status information of the other vehicle transmitted from the other vehicle;
the second detector device is a sensor that detects the other vehicle and outputs the second driving status information, which is second relative driving status information of the other vehicle with respect to the host vehicle;
the third detector device is a GPS receiver that outputs third absolute driving status information of the host vehicle; and
the controller acquires first relative driving status information of the other vehicle from the third absolute driving status information and the first driving status information of the host vehicle, and figures out the difference between the first driving status information and the second driving status information as the difference between the first relative driving status information and the second relative driving status information.

10. A control method for a controller connected to first and second detector devices that output driving status information of another vehicle, comprising the steps of:
inputting first driving status information from the first detector device;
inputting second driving status information from the second detector device; and,
when the difference between the first driving status information from the first detector device and the second driving status information from the second detector device is equal to or less than a predetermined threshold value and a detection duration of the second driving status information from the second detector device is equal to or longer than a threshold value, which is prescribed as the period of time taken for identification, determining that both the first driving status information and the second driving status information are driving status information of the other vehicle, and making the second driving status information available for use even for a shorter period than the detection duration prescribed for detection of the other vehicle by the second detector device alone.

11. The control method according to claim 10, wherein after both the first driving status information and the second driving status information are determined to be the driving status information of the other vehicle, when the second driving status information of the other vehicle fails to be outputted from the second detector device, the first driving status information is assigned as the driving status information of the other vehicle.

12. The control method according to claim 11, wherein the controller, after assigning the first driving status information as the driving status information of the other vehicle with the second driving status information of the other vehicle failing to be outputted from the second detector device, determines both the first driving status information and the second driving status information are the driving status information of the other vehicle when the difference between the first driving status information from the first detector device and the second driving status information newly outputted from the second detector device is equal to or less than a predetermined threshold value.

13. The control method according to claim 12, wherein the first detector device is a communication device that receives the first driving status information, which is first absolute driving status information of the other vehicle transmitted from the other vehicle;
the second detector device is a sensor that detects the other vehicle and outputs the second driving status information, which is second relative driving status information of the other vehicle with respect to the host vehicle; and
the controller is further connected to a GPS receiver that outputs third absolute driving status information of the host vehicle, acquires first relative driving status information of the other vehicle from the third absolute driving status information and the first driving status information of the host vehicle, and figures out the difference between the first driving status information and the second driving status information as the difference between the first relative driving status information and the second relative driving status information.

* * * * *